United States Patent [19]

Smith et al.

[11] Patent Number: 4,515,429
[45] Date of Patent: May 7, 1985

[54] NONLINEAR AND BISTABLE OPTICAL WAVEGUIDE DEVICES

[75] Inventors: Peter W. Smith, Colts Neck; Walter J. Tomlinson, III, Holmdel, both of N.J.

[73] Assignee: AT&T Bell Laboratories, Murray Hill, N.J.

[21] Appl. No.: 153,255

[22] Filed: May 27, 1980

[51] Int. Cl.³ .............................................. G02B 5/174
[52] U.S. Cl. ................. 350/96.13; 350/96.34; 350/354
[58] Field of Search ............... 350/96.13, 96.31, 96.34, 350/353, 347 V, 354, 96.12; 585/534, 505

[56] References Cited

U.S. PATENT DOCUMENTS

| | | | |
|---|---|---|---|
| 4,196,396 | 4/1980 | Smith | 356/352 |
| 4,236,785 | 12/1980 | Papuchon et al. | 350/96.13 |
| 4,382,660 | 5/1983 | Pratt, Jr. et al. | 350/353 |
| 4,431,263 | 2/1984 | Garito | 350/96.34 |

OTHER PUBLICATIONS

*Applied Physics Letters*, vol. 16, No. 8, Apr. 15, 1970, E. P. Ippen, pp. 303–305, "Low Power Quasi-cw Raman Oscillator".

*Applied Physics Letters*, vol. 28, No. 12, Jun. 15, 1976, pp. 731–733, Felber et al., "Theory of Nonresonant Multistable Optical Devices".

*Applied Physics Letters*, vol. 30, No. 6, Mar. 15, 1977, pp. 280–281, Smith et al., "Bistable Fabry-Perot Resonator".

*Sov. Physics JETP*, vol. 45, No. 5, May 1977, pp. 896–905, Kaplan, "Theory of Hysteresis Reflection and Refraction of Light by a Boundary of a Nonlinear Medium".

*Fiber & Integrated Optics*, Plenum Publ. Corp., 1979, pp. 157–182, "Fiber Raman Lasers", R. H. Stolen.

*IEEE Journal of Quantum Electornics*, QE-15, No. 12, Dec. 1979, Klein et al., "Observation of Mirrorless Optical Bistability and Optical Limiting Using Stark Tunable Gases".

*Applied Physics Letters*, vol. 28, No. 12, Jun. 15, 1976, pp. 719–721, Jain et al., "Optical Transistor".

*Assistant Examiner*—Frank González
*Primary Examiner*—William L. Sikes
*Attorney, Agent, or Firm*—Daniel D. Dubosky; Wendy W. Koba

[57] ABSTRACT

Several types of nonlinear characteristics are provided in an optical device wherein at least two optical materials are constructed to provide a waveguide structure. At least one of the materials has a dominant nonlinear characteristic over the length of the waveguide that is commonly referred to as the Kerr effect. The index of refraction in this material is a function of the light intensity in the waveguide. By selecting materials that provide either positive or negative Kerr coefficients, and by constructing the device with the nonlinear material either as the core or as the cladding layer, power output versus input characteristics that exhibit both limiting and amplification can be provided. A bistable characteristic is provided in one of the embodiments by terminating the waveguide structure with a mirror. Specific embodiments using carbon disulfide and polydiacetylene as the nonlinear materials are disclosed.

2 Claims, 14 Drawing Figures

NONLINEAR AND BISTABLE OPTICAL WAVEGUIDE DEVICES

BACKGROUND OF THE INVENTION

This invention relates to nonlinear and bistable optical devices and, more particularly, to nonlinear and bistable optical devices that utilize a Kerr medium, that is, a medium in which the index of refraction is a function of the optical intensity within the medium.

The prior art has produced a nonlinear device that utilizes a Kerr medium. See the article entitled "Theory of Nonresonant Multistable Optical Devices," F. S. Felber and J. H. Marburger, *Applied Physics Letters*, Vol. 28, No. 12, June 15, 1976, pp. 731–733. In this Felber et al device, the Kerr medium substantially fills an interferometer cavity. This type of device was suggested by Felber et al in order to provide a bistable interferometer which is not dependent on the resonant or absorption parameters of the medium as in still other prior art interferometer devices. As taught by Felber et al, this type of interferometer device with a Kerr medium in theory at least provides a bistable device which exhibits differential gain and may be utilized as a memory element, a power limiter or optical switch providing the device is suitably biased. Since the effect utilized does not depend on any resonant properties of the medium, the device may be biased by an independent field whose frequency differs from that of the field being amplified. Since the dependence of the refractive index on light intensity is a very weak effect for all known materials, devices such as the Felber et al device require high light intensities. The Felber et al device requires power densities in the order of $10^8$ watts/cm$^2$. The use of a Fabry-Perot interferometer not only restricts the response time of the device to be at least as long as the build-up time of the interferometer, but also requires that the input radiation be restricted to a narrow bandwidth.

In still another prior art device, nonlinear and bistable characteristics are provided by an interferometer cavity that is substantially filled with an electro-optic material having terminals to which a potential can be applied. Since the index of refraction of this electro-optic material is dependent on this potential, the cavity can be tuned by changing the magnitude of the potential applied to the electro-optic medium. A photodetector is caused to be responsive to the energy density of the optical radiation within the cavity and the potential developed by this photodetector is coupled to the terminals of the electro-optic medium. The resulting device exhibits external characteristics that are similar to those predicted for the Felber et al device, but it does so when using optical radiation that can be many orders of magnitude lower in power than that required when using a Kerr medium in an interferometer device. Restrictions caused by the use of a Fabry-Perot interferometer are the same as those for the Felber et al device. In addition, the response time may be further limited by the electrical circuitry. Devices which use an electro-optic medium within an interferometer cavity are disclosed in patent application Ser. No. 902,733, filed on May 3, 1978, by P. W. Smith, and in the article entitled "A Bistable Fabry Perot Resonator," by P. W. Smith and E. H. Turner, Applied Physics Letters, Vol. 30, No. 6, Mar. 15, 1977, pp. 280–281.

SUMMARY OF THE INVENTION

In accordance with the present invention, nonlinear and bistable characteristics are provided by an optical device wherein a waveguiding structure uses a Kerr medium either as the waveguide core or as the cladding material. The material that exhibits the dominant Kerr effect is selected to have an index of refraction that is substantially equal to that of the other material when it is illuminated by an intensity of light corresponding to a critical threshold level of power, $P_c$. By selecting different materials with either positive or negative Kerr coefficients and placing them either as the waveguide core or as the cladding material surrounding the core, various nonlinear functions can be realized.

A limiter characteristic is one in which the output light intensity remains relatively constant as a function of input light intensity, after the input light intensity exceeds a predetermined threshold level. This type of characteristic can be provided in accordance with the present invention either by using a medium having a positive Kerr coefficient as the material surrounding the waveguide core or by using a medium having a negative Kerr coefficient as the waveguide core. In the case where the Kerr medium surrounds the waveguide core as a cladding layer, its index of refraction is selected to be less than that of the waveguide core at zero light intensity but equal to that of the waveguide core at the predetermined threshold level of power. For input light intensities up to the level of the predetermined threshold, the structure operates in a waveguiding mode. For light intensities greater than the predetermined threshold, the structure no longer serves as a waveguide and the input light intensity diffracts into the cladding layer. The same characteristic can be provided in accordance with the present invention by using a Kerr medium with a negative coefficient as the waveguide core and selecting its index of refraction such that it is approximately equal to the surrounding cladding layers at the predetermined threshold of input light intensity. In this latter case, the index of refraction of the waveguide core decreases with increasing light intensity to the point where the structure no longer operates as a waveguide for light intensity beyond the predetermined threshold.

What is hereinafter called a triode characteristic is one in which the output light intensity of the device is a small portion of the input light intensity up to a critical predetermined threshold at which point the output light intensity increases substantially for a small increase in the input intensity and thereafter maintains a linear relationship with the input light intensity. This triode characteristic can be provided in accordance with the present invention by using a Kerr medium having a negative coefficient as the cladding layer surrounding the waveguide core or by using a Kerr medium having a positive coefficient as the waveguide core in the waveguide structure. In the first case wherein the Kerr medium having a negative coefficient is used as the material surrounding the waveguide core, its index of refraction is chosen to be slightly greater than that of the waveguide core at zero light intensity. In the latter case wherein the Kerr medium having a positive coefficient is utilized as a waveguide core, the materials are chosen such that the index of refraction of the Kerr medium is less than that of the cladding material at zero light intensity. In both cases, the structure does not operate in its waveguiding mode until the input light intensity exceeds the threshold level.

A bistable characteristic is one in which the output light intensity can assume either one of two different values for at least some range of input light intensities. This type of characteristic can be provided in accordance with the present invention by a waveguiding structure wherein the cladding material is a Kerr medium having a negative coefficient or wherein the waveguide core is a Kerr medium having a positive coefficient. In both cases the input light intensity is coupled through a beam splitting mirror into the waveguiding structure which is in turn terminated by a mirror at the end of the waveguide. Light that is reflected back through the device by this mirror is then reflected by the beam splitter to serve as the output of the device. In both cases, the structure does not operate as a waveguide until a predetermined threshold level of input light intensity is presented to the device. At this time waveguiding takes place for all values of input light intensities that are greater than a threshold level and in addition for input light intensities that are less than the threshold level after the threshold level has been exceeded, since the mirror reflects the guided mode back on itself thereby doubling the effective light field at the interface between the waveguide core and the cladding layer. Waveguiding continues as the input light intensity is decreased down to a second threshold level that is lower in magnitude than the first mentioned threshold level.

In all of the above-mentioned embodiments of the present invention, the Kerr effect must be the dominant nonlinear effect. The light intensities must in all cases be less than that which will produce optical damage and less than that which will create objectional thermal effects. In addition the length of the waveguide structure must be long enough to permit the desired level of discrimination between guided and nonguided light, and the length of the waveguiding structure must be less than the length at which stimulated Raman or Brillouin scattering contributes a significant effect. Specific embodiments utilizing a diacetylene crystal with a polydiacetylene film and a glass optical fiber with a carbon disulfide cladding are disclosed in the detailed description.

Because no resonator is used in the present invention, and because the devices use a nonresonant nonlinearity, the devices can work over a broad band of light wavelengths and no precise tuning of the incident light frequency is required. Also, because an intrinsic nonlinearity is used, the response time can be very fast. The transit time through the device is $2L/c$ where $L$ is the waveguide length and $c$ is the velocity of light in the medium. The response time may be even shorter because of travelling wave effects.

BRIEF DESCRIPTION OF THE DRAWING

These advantages and others will become more readily apparent after reading the following detailed description in conjunction with the drawings wherein.

DETAILED DESCRIPTION

Figure 1:
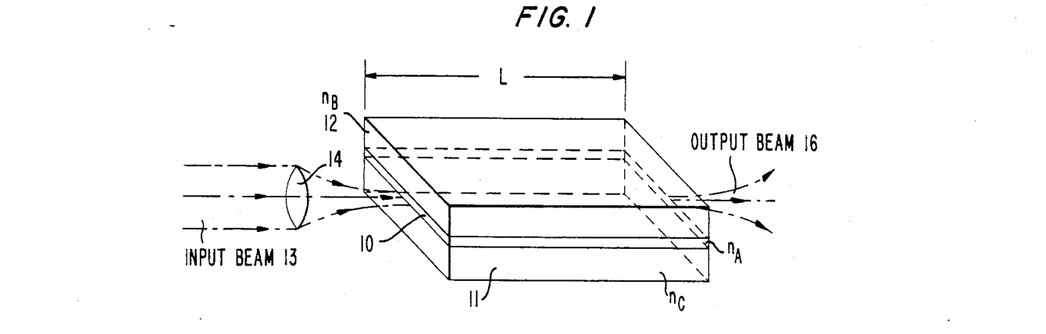
FIG. 1 is a pictorial representation of a device constructed in accordance with the present invention to provide a nonlinear characteristic between input and output light intensities.

FIG. 1 shows a waveguide structure in which the present invention can be practiced. A waveguide core layer 10 is sandwiched between layers 11 and 12 in the structure. As is well known in the art waveguide core 10 must have an index of refraction that is greater than the surrounding or cladding layers in order for waveguiding to occur. An input beam 13 is typically focused by a lens 14 so as to couple the input radiation into the waveguide core 10. The emerging radiation appears in output beam 16. It should be clear to those skilled in the art that the input could be in the form of light guided in a fiber or a light source such as a luminescent diode or semiconductor laser. Similarly, the output could be coupled into another optical fiber, another nonlinear device, or directly into a detector. In accordance with the present invention at least one of the layers in the waveguiding structure is a layer that exhibits the nonlinear Kerr effect, that is, a layer whose index of refraction is a function of the light intensity. Although planar waveguide structures, which only guide the light in one dimension, have been shown herein for illustration, those skilled in the art will realize that our invention also applies to waveguide structures with guiding in both transverse dimensions.

FIGS. 2–5 illustrate some of the combinations of waveguiding layers that can be utilized to practice the present invention. As indicated in FIG. 1 layers 11 and 12 need not have the same index of refraction. For simplicity, however, the embodiments which are shown in FIGS. 2–5 all involve waveguiding structures in which both cladding layers have the same index of refraction characteristics.

Figure 2:
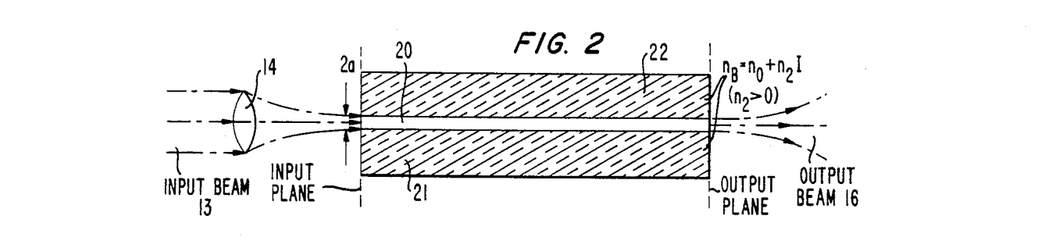
FIGS. 2–5 are cross sectional views of the waveguide device shown in FIG. 1 illustrating different embodiments of the device.

In FIG. 2 the input beam 13 of single mode radiation is focused by lens 14 down to a beam-waist of $2a$ so as to couple into waveguide core 20 of the waveguide structure in FIG. 2. The cladding layers 21 and 22 are constructed of materials that are selected to have an index of refraction $n_B$ which is equal to a zero intensity index of refraction, $n_0$, plus $n_2I$, where $n_2$ is a (positive) Kerr coefficient and $I$ is the intensity of the radiation. The material for layers 21 and 22 is chosen relative to the waveguide core such that $n_B$ is less than $n_A$ at zero light intensity, but for some value of light intensity that is coupled to the input of the waveguide core, $n_B$ at the core-cladding interface increases to be equal to $n_A$.

Figure 3:
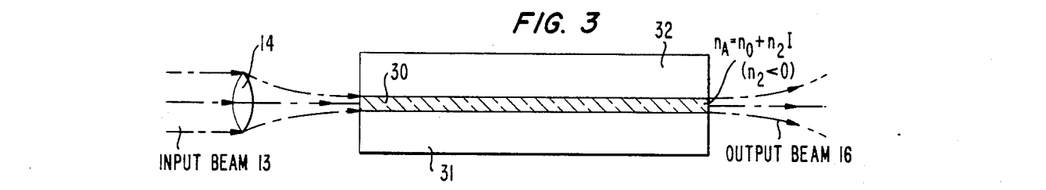

In FIG. 3 the single mode of input radiation is coupled into a waveguide core 30 whose index of refraction $n_A$ is equal to $(n_0+n_2I)$. In this case the waveguide core is the layer which exhibits the nonlinear Kerr effect and the material is chosen to have a negative Kerr coefficient, that is, a material in which the index of refraction decreases with increased light intensity ($n_2<0$).

Figure 4:
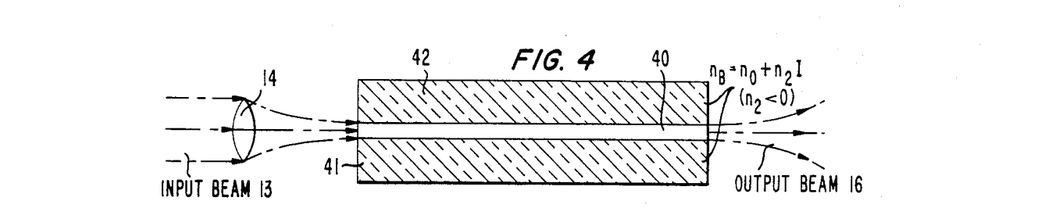

In FIG. 4 the input beam of single mode radiation is coupled to a linear waveguide core and the surrounding or cladding layers 41 and 42 are selected such that these layers exhibit a Kerr effect with a negative Kerr coefficient. Finally the waveguiding structure in FIG. 5 has a waveguide core 50 that is selected to have a positive Kerr coefficient. In all of the figures a crosshatch downward and to the left indicates a Kerr medium with a positive Kerr coefficient whereas a crosshatch downward to the right indicates a negative Kerr coefficient.

Figure 5:
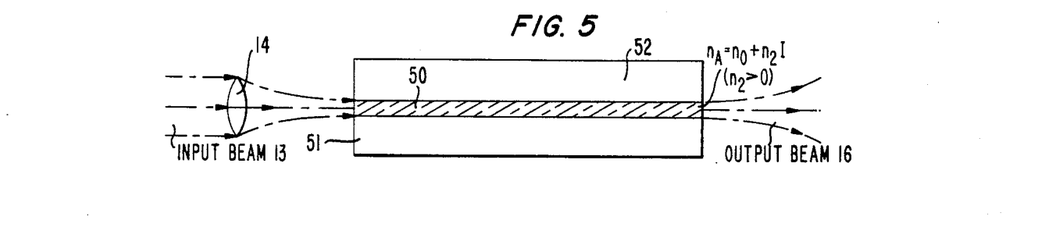
Figure 6:
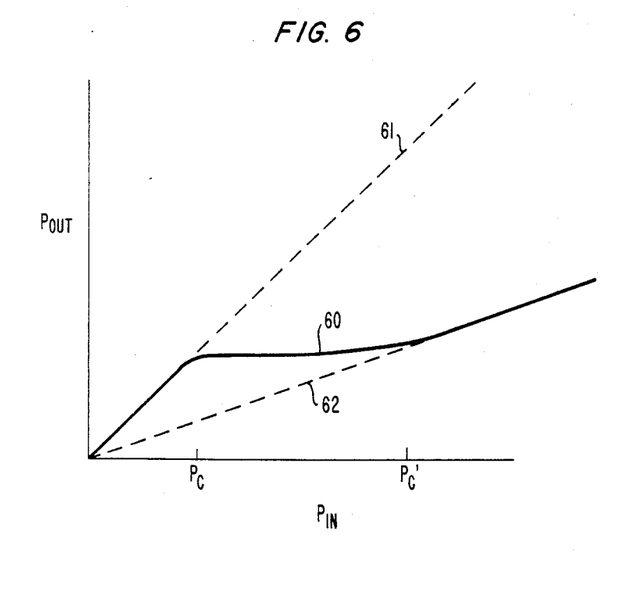
FIGS. 6 and 7 are the input versus output light power characteristics that are provided by the devices illustrated in FIGS. 1–5.
Figure 7:
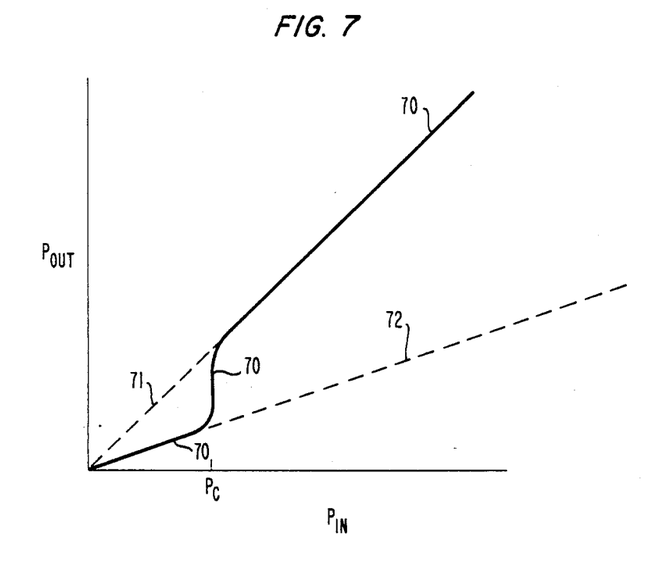

The operation of the waveguide devices illustrated in FIGS. 2-5 can best be described by referring to the graphs shown in FIGS. 6 and 7. In all four cases shown in FIGS. 2-5 the materials are selected such that the index of refraction of the waveguide core is equal to that of the cladding layers at the core-cladding interface in the input plane when the input light intensity corresponds to an input power of $P_c$.

The analysis which follows is based on a simplified model of waveguide behavior which neglects the spatial dependence of the waveguide modes. Although the numerical values are only approximate, the model describes the basic physical mechanism involved. In FIG. 6 curve 60 illustrates the power out versus power in characteristics for the devices shown in FIGS. 2 and 3. In both of these devices the structure provides waveguiding for all light intensities corresponding to powers from zero up to $P_c$. Therefore, the power out versus power in characteristic follows curve 61 which is a 45° line relative to the abscissa in FIG. 6. At a light intensity input corresponding to $P_c$ the evanescent field from waveguide core 20 of FIG. 2 is sufficiently strong in intensity to have increased the index of refraction of cladding layers 21 and 22 at the interface to a value that is equal to that of the waveguide core at the input plane of the waveguide structure. For intensities that correspond to powers that are slightly greater than $P_c$, the structure of FIG. 2 will no longer provide waveguiding at the input end, and the light will be permitted to diverge from the beamwaist formed by the lens thereby decreasing the light intensity in the waveguide until a level is reached that corresponds to one which will permit waveguiding to continue. As the intensity of light is increased further, the point at which this takes place will move further and further along the waveguide until it reaches the far end of the waveguiding structure. Hence for all powers of the input light beam between $P_c$ and $P_c'$ in FIG. 6, a constant intensity is maintained at the output end of the waveguide core. Accordingly, any detector that is positioned so as to detect radiation that is present only in the waveguide core 20 will receive a constant amount of power for all input powers between $P_c$ and $P_c'$. For powers greater than $P_c'$ at the input, there is no part of the waveguiding layer which will exhibit waveguiding and the beam will diverge and present a power to the output sensor which represents a constant percentage of the input power. The percentage represented of course depends on the length of the waveguiding structure and the area of the detector. Accordingly for all input powers greater than $P_c'$ the output power will increase at a slope dependent on the length of the waveguide and area of the detector.

As will be appreciated by those skilled in the art, this type of structure can be utilized for input powers between zero and $P_c'$ to provide a limiter characteristic, that is, one which provides a constant output power for all input powers greater than a critical threshold level $P_c$.

The device shown in FIG. 3 provides an input versus output characteristic similar to the one provided by the device in FIG. 2, i.e., the characteristic illustrated by curve 60 in FIG. 6. In the case of this structure, however, the index of refraction of the waveguide core decreases with increased light intensity. At the threshold level, $P_c$, the radiation in the waveguide core begins diverging from the waveguide at the input end of the structure. As the input light intensity is increased, the point where waveguiding begins moves further and further along the waveguiding structure. Finally the input light intensity is great enough that waveguiding does not occur at any point in the structure, and the output power follows curve 62 which simply represents the percentage of power that is detected by a sensor that is positioned at a distance L from the beam-waist of a focused beam.

The waveguide structures shown in FIGS. 4 and 5 provide an input characteristic illustrated by curve 70 in FIG. 7. In the device shown in FIG. 4 the material for the cladding layers 41 and 42 is selected such that its index of refraction is greater than that of the waveguide core 40 for all input light intensities that correspond to powers between zero and a threshold level of $P_c$. In the input plane at $P_c$, the index of refraction of the cladding layers 41 and 42 at the core-cladding interface has decreased to the point where the index of the cladding layer becomes less than that of the waveguide core 40. As a result, layer 40 begins to act as a waveguide. The input power is guided along the waveguide, and the output power increases from the nonwaveguiding curve 72 up to a level corresponding to the waveguiding curve 71. Here in FIG. 7, as in FIG. 6, curve 71 represents the output versus input power characteristic for a waveguiding structure and curve 72 represents the level of output power available at a detector or sensing device that is positioned at a distance of L from the input beam-waist. For input light intensities that correspond to powers greater than $P_c$ the waveguide structure in FIG. 4 continues to act as a waveguide, therefore its characteristic follows curve 71. As indicated in FIG. 7 the device in FIG. 4 will provide a characteristic that we have called a triode characteristic, that is, one in which small variations of input power around the threshold level of $P_c$ can provide considerably larger variations in the output power.

A similar output versus input power characteristic can also be provided by the structure shown in FIG. 5 where the waveguide core is a material which exhibits a positive Kerr coefficient and its index is chosen to be less than that of the cladding layers for light intensities that are close to zero. As the light intensity at the input plane increases, the index of refraction of the waveguide core 50 at the core-cladding interface increases until it reaches a value at which the entire structure can operate as a waveguide.

Figure 8:
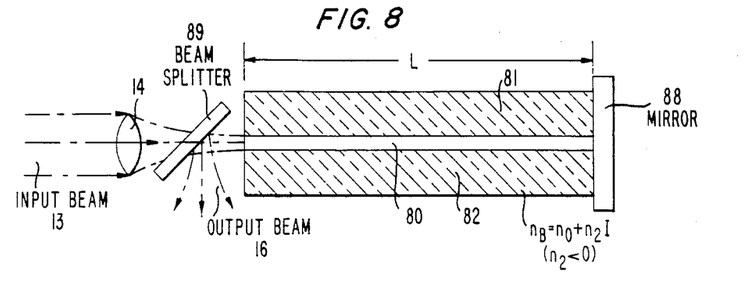
FIGS. 8 and 9 are schematic diagrams of devices constructed in accordance with the present invention to provide a bistable characteristic.
Figure 9:
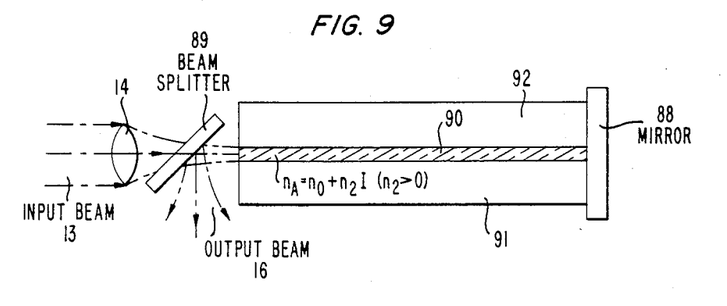
Figure 10:
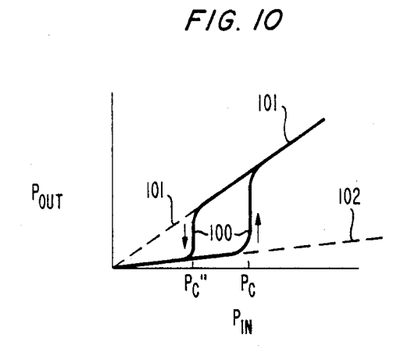
FIG. 10 is an illustration of the bistable characteristic provided by the devices in FIGS. 8 and 9.

FIGS. 8 and 9 show structures that can provide, in accordance with the present invention, still another type of power-out versus power-in characteristic, which is illustrated in FIG. 10. In FIG. 8 the input light beam 13 of single mode radiation is focused by lens 14 so as to couple the radiation into the waveguide core 80. Layer 80 in turn is surrounded by cladding layers 81 and 82 that are selected to provide an index of refraction that exhibits a negative Kerr coefficient. The end of the waveguide structure is terminated by a mirror 88 that will cause light in the waveguiding element 80 to be reflected. Light that is coupled back through the waveguide core impinges upon a beam splitter 89 that reflects this output light to form an output beam 16. It should be clear to those skilled in the art that other methods of separating the output beam can be employed. For example, an integrated optical directional coupler could be employed. The output could also be obtained through the rear mirror by making rear mirror 88 partially transmitting. The materials of the waveguide core and cladding layers are chosen such that waveguiding does not occur until a threshold level $P_c$ of input power is achieved. For input light intensities that are greater than this threshold level, the index of refraction of layer 80 at the waveguide interface is greater than the index of the cladding layers and the structure will act as a waveguide. After waveguiding is achieved, the radiation within waveguiding layer 80 has a double effect on the material in the cladding layers. The evanescent field from this waveguide radiation not only has an effect on the cladding layers during its transit from the input of the waveguide up to the mirror, but it is then reflected and has an effect as this radiation transverses the waveguide from the mirror back to the beam splitter 89. As a result the input level can be decreased to powers that are less than $P_c$ and the device will still continue to function as a waveguide down to a lower threshold level $P_c''$ as indicated in FIG. 10. At this lower threshold level the light intensity is not great enough to permit waveguiding even though the radiation has a double effect, and for intensities lower than this threshold level $P_c''$ the entire device continues to function as a nonwaveguiding optical device.

A similar power output versus power input characteristic 100 as shown in FIG. 10 can also be provided by the structure in FIG. 9 wherein waveguide core 90 is constructed of a material that exhibits an index of refraction with a positive Kerr coefficient. In this device of FIG. 9 the index of refraction of the waveguide core increases with increased light intensity until threshold level $P_c$ is reached at which point the device becomes a waveguide for all light intensities greater than $P_c$. Here again, as in FIG. 8, after waveguiding is achieved, the light within the waveguide core 90 has a double effect on the nonlinear material and therefore the light intensity can be decreased to levels lower than that corresponding to $P_c$ and the device will continue to function as a waveguide. Finally, however, the light intensity is so low that even the double pass of the radiation will not be sufficient to maintain waveguiding. At this point, threshold level $P_c''$, the output versus input power characteristic drops to curve 102, the nonwaveguiding curve. In both devices shown in FIGS. 8 and 9 the nonwaveguiding curve 102 corresponds to the power that would be detected by a sensing device that is positioned 2L from the waist of a focused beam, where L is the length of the device.

Additional meaning can be given to the abovementioned threshold level $P_c$ by considering the following analysis. As is well known to those skilled in the art, a beam that is focussed by a lens, for example, to a radius of "a" will diverge at a diffraction angle of $\theta$, where $$\theta \simeq \frac{\lambda}{n \pi a} \tag{1}$$

where $\lambda$ is the wavelength, n is the index of refraction and a is the radius of the beam. In order to couple efficiently into the fundamental waveguide mode, it is necessary for the input beam to have a far-field diffraction angle of $\theta_c$ where $$\theta_c \simeq \sqrt{\frac{2\Delta}{n}} \tag{2}$$

where $\Delta$ is the difference between the refractive index of the waveguide core and the refractive index of the cladding layers. Efficient coupling can thus be obtained for the core where $\theta$ equal to $\theta_c$ and therefore:

$$\sqrt{\frac{2\Delta}{n}} = \frac{\lambda}{n \pi a}. \tag{3}$$

To the level of approximation used in this analysis, with either positive or negative Kerr coefficients, and starting at low light levels with either guiding or nonguiding, the threshold will occur at the intensity $I_c$ where $$\Delta = |n_2|I_c = \frac{|n_2|P_c}{\pi a^2} \tag{4}$$

where $|n_2|$ is the absolute value of the Kerr coefficient and $P_c$ is the power corresponding to the light intensity $I_c$. Substituting the value of $\Delta$ given by Equation (4) into Equation (3) we obtain:

$$\frac{2n_2 P_c}{\pi a^2 n} = \frac{\lambda^2}{n^2 \pi^2 a^2} \tag{5}$$

which reduces to:

$$P_c = \frac{\lambda^2}{2\pi n_2 n}. \tag{6}$$

Equation (6) provides an approximate value of $P_c$, the input power at which the device begins to deviate from its low-power behavior, as illustrated in FIGS. 6 and 7. It should be noted that this power is independent of the beam radius a. Accordingly, a may be changed in order to insure that the intensity, I, for any given structure is lower than the value at which optical damage occurs.

Many media that exhibit the Kerr effect also exhibit stimulated Raman scattering when the light intensities are great enough. One such medium is carbon disulfide. In order to prevent the losses and wavelength shifts that occur by stimulated Raman scattering, the length of the waveguide structure must be less than $L_R$ where $L_R$ is defined by the following equation:

$$L_R \simeq \frac{\gamma \pi a^2}{gP} \tag{7}$$

As pointed out by R. H. Stolen on pp. 163–164 of the text "Fiber and Integrated Optics," edited by D. B. Ostrowsky, Plenum Publishing Corporation, 1979, $\gamma$ is a threshold parameter which is approximately equal to 16 for a typical long fiber and this parameter $\gamma$ varies only slightly with changes in fiber parameters. The parameter g is the peak Raman gain for the material under consideration and P is the input power. Substituting for P the value of $P_c$ given by Equation (6) into Equation (7), we obtain an approximate expression for the length of the waveguiding structure which must not be exceeded in order to prevent losses and wavelength shifts due to stimulated Raman scattering.

$$L_{max} = \frac{2\gamma\pi^2 n n_2 a^2}{g\lambda^2} \quad (8)$$

As pointed out hereinabove, a focused beam will diverge in accordance with the equation presented as Equation (1). In order to discriminate between the guided and nonguided state of the device, the guide or device must be greater in length than $L_D$ where $L_D$ is defined by:

$$L_D = m\frac{\pi a^2}{\lambda} \quad (9)$$

where m is a numerical factor equal to or greater than 1, a is the radius of the beam-waist and $\lambda$ is the wavelength. When the device is in the nonguiding state, the output signal of a detector, which is sensitive to the radiation in the waveguiding element, will receive only a portion, $f_d$, of the output signal that is present where $f_d$ is given approximately by:

$$f_d = \frac{1 - e^{-2/(1+m^2)}}{1 - e^{-2}} \quad (10)$$

The following table lists the required values of m for various values of the discrimination parameter $f_d$:

TABLE

| $f_d$ | m |
|---|---|
| 0.2 | 3.1 |
| 0.1 | 4.6 |
| 0.05 | 6.7 |
| 0.02 | 11 |
| 0.01 | 15 |
| 0.001 | 48 |

From Equations (8) and (9) we can establish the following condition for the length L of the guide.

$$m \leq \frac{L\lambda}{\pi a^2} \leq \frac{32\pi n n_2}{g\lambda} \quad (11)$$

As indicated hereinabove carbon disulfide is a material which is a Kerr medium but is also a medium which will exhibit stimulated Raman scattering for sufficiently long lengths of the medium. For a structure in which carbon disulfide is present as the cladding for a glass fiber waveguiding medium, the above equations can be utilized to determine the maximum discrimination parameter that is available from this medium. Using the value for g given in the above-identified textbook article by R. H. Stolen, the upper limit of Equation (11) at a wavelength of 500 nanometers provides a value of m≈7. Consequently, at this wavelength the carbon disulfide would only be suitable if a discrimination parameter greater than about 0.04 was acceptable. To achieve this maximum discrimination parameter at this wavelength, the length of the waveguide L should be equal to about $4.4 \times 10^5$ a²cm, where a is in cm.

Figure 11:
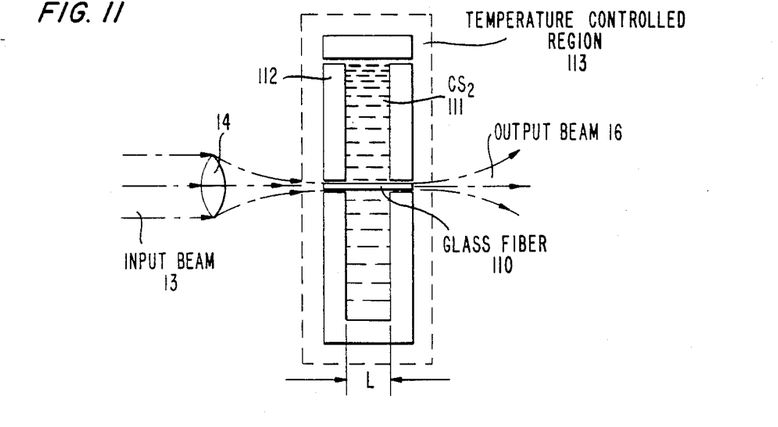
FIG. 11 illustrates the construction of a device in accordance with the present invention that utilizes a glass fiber surrounded by a carbon disulfide cladding layer.

An embodiment of the present invention that utilizes carbon disulfide as the Kerr medium is shown in FIG. 11 of the drawings. In FIG. 11 a glass fiber 110 is held in position by the two sides of a glass enclosure 112. Fiber 110 is constructed of glass having an index of refraction close to that of carbon disulfide. Enclosure 112 is filled with carbon disulfide material 111 and the entire structure is positioned within a temperature controlled region 113 thereby permitting a fine tuning adjustment of the index of refraction of the carbon disulfide material. The input beam 13 is focused by lens 14 so as to impinge on one end of glass fiber 110. The output of fiber 110 emerges as output beam 16. Inasmuch as the carbon disulfide material is a Kerr medium with a positive Kerr coefficient, this embodiment is equivalent in function to the one illustrated in FIG. 2 of the drawings.

The carbon disulfide material has an index of refraction approximately equal to 1.6 and a Kerr coefficient, $n_2$, approximately equal to $3 \times 10^{-8}$ cm²/megawatt. Accordingly, for a wavelength equal to 500 nanometers, Equation (6) can be used to calculate the critical power, that is, the power at which waveguiding ceases to exist. For the parameters given the critical power can be computed to equal $8.3 \times 10^3$ watts. To avoid optical damage the intensity should be less than or equal to about $10^{10}$ watts/cm². Hence to avoid optical damage the radius of a circular fiber should be less than or equal to about 5 micrometers. As pointed out hereinabove the length of the guide should be equal to about $4.4 \times 10^5$ a² cm, where a is the fiber radius in cm, in order to avoid stimulated Raman scattering. Using this fact the fiber in FIG. 11 having a radius of about 5 microns should have a length, L, equal to about 1.1 millimeters.

Figure 12:
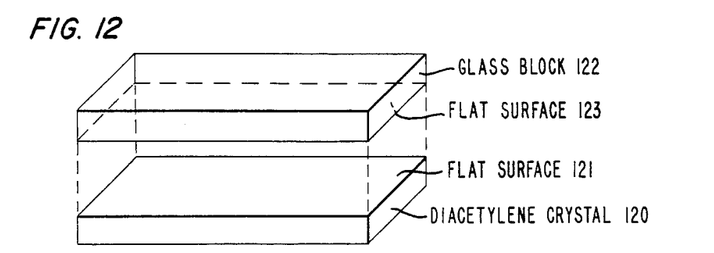
FIGS. 12–14 illustrate the construction of a device in accordance with the present invention which utilizes a polydiacetylene film as the Kerr medium.
Figure 13:
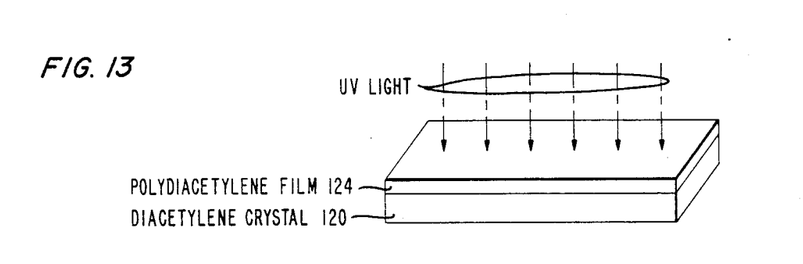
Figure 14:
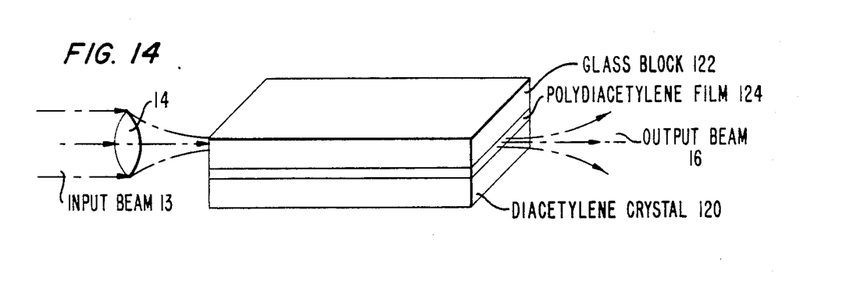

The polydiacetylenes are another promising class of materials with large optical Kerr coefficients. FIGS. 12 and 13 illustrate the steps in a process which will yield the embodiment of the present invention shown in FIG. 14 of the drawings. As indicated in FIG. 12, a diacetylene crystal 120 made of TCDU or PTS compound is grown and prepared to have a flat face 121 using standard crystal-polishing techniques. A glass block 122 is also prepared to have a flat surface 123 which will interface with the flat surface of the diacetylene crystal. To prepare a thin waveguide of a polydiacetylene, the flat surface 121 of crystal 120 is exposed to strong ultraviolet light as illustrated in FIG. 13. The diacetylene crystal has a strong absorption in the ultraviolet region and as a result a waveguide is formed on the surface of the crystal by the polymerization that takes place by exposure of the crystal to the ultraviolet light. The wavelength of the radiation should be chosen such that most of the light is absorbed in a layer with a thickness equal to the desired waveguide thickness. The desired thickness will typically be equal to about 0.5 micrometers and for the diacetylene material TCDU this requires light with a wavelength of about 250 micrometers. Finally, the glass block 122 and crystal 120 with polydiacetylene film 124 are optically contacted as shown in FIG. 14 such that the film is sandwiched between the glass block and the unpolymerized portion of crystal. As illustrated in FIG. 14 the input light can be focused on one end of the film with lens 14.

If the Kerr coefficient for the polydiacetylene is positive, the glass block 122 should be selected to have an index that is equal to or slightly higher than that of the polydiacetylene in order to construct an embodiment of the invention that is functionally equivalent to the ones shown in FIGS. 5 and 9. There are several techniques that can be used to adjust the index difference to within the required precision, which is typically about $10^{-3}$. The polydiacetylenes are strongly birefringent and have their largest index (and largest nonlinearity) for light that is polarized along the polymer chains. By adjusting the direction of propagation of the light relative to the polymer orientation one can adjust the effective index of the film. The refractive index of polydiacetylenes is also quite dispersive, so one can also adjust the index difference between the film and the glass block by changing the wavelength of the input light. As a specific example, the polydiacetylene PTS can be used with Schott type LaSF 6 glass. At a wavelength of 1.01 μm the glass has an index of 1.933 while the index of PTS is about 2.0 for light polarized parallel to the polymer axis, and about 1.6 for the perpendicular polarization. To achieve an index match one then needs to direct the light such that its electric field direction makes an angle of about 20° with the direction of the polymer chains. For longer wavelengths the required angle will be somewhat smaller.

In the above discussion we have assumed that the waveguide is in the form of a planar or two-dimensional guide, but the same techniques can also be used to make a three-dimensional guide. The only change necessary is in the UV exposure step that forms the polymer. By exposing through a mask, with a long narrow opening, or by using a UV beam that has been focused to a line, the crystal will only be polymerized in a narrow stripe along the surface.

While the simple butt coupling scheme illustrated in FIG. 14 is conceptually the simplest technique, for some materials it may be difficult to prepare the end of the film with a sufficiently flat face, and other coupling techniques may be preferable. One such technique is to use a grating coupler. A grating can be fabricated on the surface of the glass block and used to couple light from the input beam into the waveguide. Techniques for designing and fabricating such grating couplers are well known in the field of integrated optics.

A possible alternate technique for making a polydiacetylene waveguide is to use the Langmuir-Blodgett technique for preparing monolayers of oriented molecules. It has been shown that one can make optical waveguiding films by the Langmuir-Blodgett technique, and it has been shown that one can make films of diacetylenes by this technique and can then photoinitiate polymerization of the films.

We claim:

1. A nonlinear optical device comprising at least two optical materials structurally arranged to provide an optical waveguide having a predetermined length, L, one of said two materials being bounded by the other of said two materials, at least one of said two materials having a dominant nonlinear effect over the length, L, of said waveguide characterized in that said at least one of said two materials has an index of refraction which changes by $n_2 I$ with changes in light intensity, I, where $n_2$ is defined as a Kerr coefficient, and the length, L, of said waveguide is less than $L_R$, the threshold length for stimulated Raman scattering, which is approximately $16/gI_c$, where $I_c$ is the light intensity at which the index of refraction of said at least one of said two materials equals the index of refraction of the other of said two materials, and g is the peak Raman gain for said at least one of said two materials.

2. A nonlinear optical device as defined in claim 1 where the optical device is further characterized in that one of said two materials is carbon disulfide.

* * * * *